United States Patent [19]

Rossi et al.

[11] Patent Number: 5,276,102
[45] Date of Patent: Jan. 4, 1994

[54] ELECTRICALLY CONDUCTIVE POLYTHIOPHENEAMINE POLYMER NETWORKS

[75] Inventors: Giuseppe Rossi, Dearborn; Susan M. Ward, Ann Arbor; Henk van Oene, Westland; Joseph W. Holubka, Livonia, all of Mich.

[73] Assignee: Ford Motor Company, Dearborn, Mich.

[21] Appl. No.: 1,596

[22] Filed: Jan. 7, 1993

[51] Int. Cl.$^5$ ................................................. C08F 8/00
[52] U.S. Cl. .................................. 525/327.2; 252/500; 252/518; 524/167; 524/401; 524/404; 524/408; 524/415; 524/422; 525/383
[58] Field of Search ............................ 525/327.2, 383; 524/167, 401, 404, 408, 415, 422; 252/500, 518

[56] References Cited

U.S. PATENT DOCUMENTS

| | | |
|---|---|---|
| 3,380,982 | 4/1968 | Berlin et al. |
| 3,663,439 | 5/1972 | Frangatos |
| 3,712,877 | 1/1973 | St. Paul et al. |
| 3,803,266 | 4/1974 | Kahle et al. |
| 3,808,173 | 4/1974 | Orihashi |
| 4,026,851 | 5/1977 | Greene |
| 4,043,948 | 8/1977 | Rakshys, Jr. et al. |
| 4,078,130 | 3/1978 | Goswami |
| 4,382,130 | 5/1983 | Ellison et al. |
| 4,399,263 | 8/1983 | Brodoway |
| 4,539,136 | 9/1985 | Broekhuis |
| 4,599,194 | 5/1986 | Frommer et al. |
| 4,617,228 | 10/1986 | Newman et al. |
| 4,617,353 | 10/1986 | Myers |
| 4,839,322 | 6/1989 | Yodice |
| 4,880,508 | 11/1989 | Aldissi |
| 4,929,389 | 5/1990 | Aldissi |
| 4,931,509 | 6/1990 | Yagishita et al. |
| 4,933,106 | 6/1990 | Sakai et al. |
| 4,933,394 | 6/1990 | Foos |
| 4,937,305 | 6/1990 | Okamoto et al. |

FOREIGN PATENT DOCUMENTS

3418093A1  11/1985  Fed. Rep. of Germany.
1-132622    5/1989   Japan.

OTHER PUBLICATIONS

Callstrom et al, Chemical Abstracts, vol. 109, No. 231663d (1988).
Diaz et al, "Electrochemistry of Conducting Polypyrrole Films," J. Electroanal. Chem. 129:115-132.
Roncali, Chem Rev. 1992, 92, 711-738, "Conjugated Poly(thiophenes):Synthesis, Functionalization, and Applications".

*Primary Examiner*—Bernard Lipman
*Attorney, Agent, or Firm*—Lorraine S. Melotik; Roger L. May

[57] ABSTRACT

Electrically conductive polythiopheneamine polymer networks are provided comprising conjugated crosslinks between polythiopheneamine polymer segments of the network. The network can be formed by crosslinking amine functional polythiopheneamine polymers, such as by crosslinking condensation reaction with conjugated polyketone crosslinkers. The amine functional polythiopheneamine polymers can be prepared by polymerization, such as by electropolymerization of amine functional thiophene monomers (the amine functionality generally being protected during polymerization) and, optionally, suitable conjugated copolymerization monomers such as thiophene, pyrrole and/or amine functional pyrrole.

14 Claims, No Drawings

ELECTRICALLY CONDUCTIVE POLYTHIOPHENEAMINE POLYMER NETWORKS

INTRODUCTION

The present invention relates to novel polymer networks and, more particularly, to polythiopheneamine polymer networks having electrical conductivity.

BACKGROUND OF THE INVENTION

Electrically conductive polymers are increasingly finding application in electrical and electronic devices, for example, as organic electrodes and the like. Enhanced conductivity is desirable to lower dissipation and, more generally, to meet the needs of more demanding applications. Electrically conductive polymers are commonly made by electropolymerization at an electrode. Typically, essentially insoluble films are produced from suitable unsaturated reactant materials forming conjugated polymer chains. The polymer chains can be made conductive, or more conductive, by doping with known materials, such as iodine, $AsF_6$ anions, etc. The dopant is thought to facilitate the transfer of charge (electrons or holes) along the conjugated polymer chain or, to a limited extent, from one polymer chain to another. Conductivity is thought to be limited by such chain-to-chain hopping processes. In principle, higher conductivities would perhaps be achievable by increasing the length of the conjugated polymer chains. If conjugated chains suitable for conductive polymers are made by electrode polymerization of reactant monomers in a good solvent for the short polymer chains, they will dissolve from the surface of the electrode into the solvent resulting in disadvantageously short polymer chains. Typically, electropolymerization synthesis procedures result in relatively short conjugation length.

Also, the polymerization process typically generates polymers with a certain level of defects in the conjugation, for example, through the introduction of $sp^3$ carbons into the backbone of the polymer intended to be conjugated entirely through unsaturated $sp^2$ and/or sp sites. Such defects in the polymerization process limit the conductivity of the polymer material. Conductive polymers may be prepared using conventional solution based polymerization processes. These processes are known to suffer potentially the disadvantage of generating the above mentioned $sp^3$ defects in the polymer backbone, reducing the conductivity of the polymer.

The use of electropolymerization to produce conducting polypyrrole polymer films is discussed by Diaz et al in *Electrochemistry of Conducting Polypyrrole Films*, J. Electroanal. Chem., 129 (1981) 115-132. The Diaz et al article describes the electropolymerization reaction process and reports the production of polypyrrole polymer films which are highly conducting when in the oxidized state. Specifically, polypyrrole polymer films are prepared by electropolymerization of pyrrole on a platinum electrode surface in an acetonitrile electrolyte solution. In addition, the preparation of poly-N-methylpyrrole and poly-N-phenylpyrrole films are described.

SUMMARY OF THE INVENTION

In accordance with a first aspect of the present invention, electrically conductive polymer networks are provided, specifically, novel polythiopheneamine polymer networks. More specifically, the polythiopheneamine polymer networks of the invention, which may comprise conductivity enhancing dopant, have conjugated crosslinking between conjugated polythiopheneamine polymer segments within the network. Transfer of charge carriers in the network functions along the conjugated polymer backbone segments by the same mechanisms found applicable to single chain polymers. While not wishing to be bound by theory, conductivity in the polymer networks of the present invention is presently understood to be enhanced by the conjugated crosslinks. The conjugated crosslinks provide, in effect, an uninterrupted conjugated structure with the conjugated polythiopheneamine polymer backbone segments, thus bypassing any $sp^3$ defects. Certain embodiments of the invention provide electrically conductive polymer networks suitable for use in electrical and electronic devices and/or have properties, such as non-linear optical effects, suitable for application in electro-optical switches, modulators or sensors. One such preferred application for electrically conductive polymer networks of the invention is as gasket material to provide EMF shielding.

According to another aspect of this invention, the polythiopheneamine polymer network is formed as the condensation crosslinking reaction product of amine functional polythiopheneamine polymers with a conjugated crosslinker as a second reactant.

According to another aspect of the invention, the amine functional polythiopheneamine polymers are the polymerization reaction product of reactant monomers comprising amine functional thiophene monomers and, optionally, conjugated copolymerization monomers. Preferably such polymerization is carried out by electropolymerization of the reactant monomers. As discussed further below, the amine functionality group may be labile, and should be reversibly protected by a protecting group during the polymerization reaction. The free amine functionality is then regenerated subsequent to polymerization for the crosslinking reaction. Additional aspects and advantages of the invention will be better understood in light of the following discussion wherein certain preferred embodiments of the invention are described in detail.

DETAILED DESCRIPTION OF CERTAIN PREFERRED EMBODIMENTS

It will be understood from the foregoing summary of the invention and from the following description of preferred embodiments, that the polythiopheneamine polymer network generally will not have free amine functionality. It is generally preferred that all or substantially all free amine functionality be consumed in condensation crosslinking reaction to form conjugated crosslinks between the conjugated polymer segments of the network. Thus, the term polythiopheneamine polymer network is used to mean the network which can be prepared as the conjugated crosslinked reaction product of amine functional polythiopheneamine polymers and/or equivalent or analogous chemical entities by whatever synthesis route produced.

The polythiopheneamine polymer segments of preferred polymer networks of the invention are fully conjugated via $sp^2$ sites. That is, they provide, ideally, an uninterrupted path of conjugated bonds along substantially their entire length. In accordance with known techniques, the monomer-to-monomer bonds of the polymer segments preferably are located in each instance between the carbon atoms adjacent to the sulfur atom of the thiophene ring. The polymer networks optionally comprise dopant material to enhance electrical conductivity. Numerous suitable dopant materials are well known and will be apparent to those skilled in the art in view of the present disclosure. Exemplary dopant materials for use in the polymer networks of the present invention include iodine, $AsF_6$ anions and the like. In that regard, it should be understood that all references herein to reactant monomers, including both amine functional thiophene and the conjugated copolymerization monomers discussed further below, may be substituted in accordance with the teachings of U.S. Pat. No. 4,929,389 to produce self-doped polymers. Certain preferred embodiments of the polythiopheneamine polymer networks of the present invention are doped to have greater electrical conductivity.

Similarly, it should be understood that the amine functional thiophene monomers and/or the conjugated copolymerization monomers may be modified to provide enhanced solubility in water in accordance with the technology of U.S. Pat. No. 4,929,389, the teaching of which is incorporated herein by reference. Thus, reference below to thiophene monomers will be understood to include analogous monomers having, for example, an alkyl group substituted for a hydrogen atom located in the beta position of the thiophene ring and having a surfactant molecule at the end of the alkyl chain. In addition, in accordance with such teaching, resultant polymers of this type having 8 or more carbon atoms in the alkyl chain in certain embodiments exhibit liquid crystalline behavior, resulting in high electrical anisotropy. Of course, such functionality must be selected so as to be compatible with the polymerization and crosslinking reactions employed to produce the polythiopheneamine polymer networks of the invention.

In addition to the fully conjugated polythiopheneamine polymer segments, it is a highly significant additional feature of the polymer networks of the invention that they comprise conjugated crosslinks, meaning crosslinks forming uninterrupted conjugation between the polythiopheneamine polymer segments. The short conjugated crosslinks of the invention significantly enhance electrical conductivity in the network. Without wishing to be bound by theory, it is presently understood that the conjugated crosslinks provide an essentially infinite conjugated structure wherein innumerable parallel and alternative conductivity paths are provided to overcome or minimize the effect of any conjugation defects (e.g., $sp^3$ link defects) in the polythiopheneamine polymer segments, i.e., the backbone segments of the network.

In view of the present disclosure, various suitable synthesis routes will be apparent to those skilled in the art for preparing the polythiopheneamine polymer networks of the invention. In accordance with certain preferred embodiments of the invention, synthesis of such polymer networks is accomplished by the condensation crosslinking reaction of amine functional polythiopheneamine polymers. The amine functional polythiopheneamine polymers preferably have an average polymer chain length of 20 to 30 monomer units and are the electropolymerization reaction product of reactant monomers comprising amine functional thiophene monomers and, optionally, conjugated copolymerization monomers in mole ratio of from 1:20 to 20:1. It will be understood by those skilled in the art that reference herein to the thiophene monomers as being "amine functional" is intended to include both thiophene monomers having free amine functionality and those having amine functionality which has been reversibly protected by reaction with a protecting group. Under some polymerization procedures, including some electropolymerization procedures, the amine group may be labile. The amine group preferably is protected as the imine, which may be prepared by reacting the monomer with acetone or similar low molecular weight ketone in the presence of pTSA or the like. The free amine can be regenerated after polymerization, generally by acid hydrolysis.

Preferred amine functional thiophene monomers include unsubstituted 2-thiopheneamine, 3-thiopheneamine and any mixture thereof. In view of the present disclosure, the suitability of numerous analogues and other equivalent monomers including, for example, substituted thiopheneamine monomers such as Cl or other halide substituted thiopheneamine monomers, will be apparent to those skilled in the art. Preferably, the amine functional thiophene monomers are polymerized together with conjugated copolymerization monomers, for example, thiophene, pyrrole, amine functional pyrrole (the amine functionality generally being protected during the polymerization reaction) and any mixture thereof. Other suitable conjugated copolymerization monomers will be apparent to those skilled in the art, who also will recognize that conjugated copolymerization monomers need not be employed in the polymerization. To control the degree of crosslinking, however, it is preferred to employ non-crosslinking functional copolymerization monomers, such as thiophene and pyrrole, together with the amine functional thiophene monomers in a ratio of from about 1:20 to about 20:1. More preferably, the non-functional conjugated copolymerization monomers are used with the amine functional thiophene monomers in a ratio of from about 20:1 to about 1:1.

Suitable electropolymerization reaction procedures for preparing the crosslinkable amine functional polythiopheneamine polymers are familiar to those skilled in the art, and are carried out for polymerization in the present invention with well known materials and techniques. Suitable materials and techniques are disclosed, for example, in the Diaz et al article identified above, the disclosure of which is incorporated herein by reference. There are numerous commercially available solvents suitable for such electropolymerization. Exemplary solvents include DMSO, methyl pyrrolidine, DMF, acetonitrile and other highly polar solvents. Additional suitable solvents will be readily apparent to those skilled in the art in view of the present disclosure. The amine functional polythiopheneamine polymers may also be prepared using conventional solution-based polymerization processes. Again, such processes are well known to those skilled in the art and will be readily applied to this invention in view of the present disclosure. In an electropolymerization process, the polythiopheneamine polymer generally will not form a deposited film on the surface of the electrode. This will depend in part on the solubility of the polymer in the solvent used in the electropolymerization process. In certain applications, however, it may be desirable to form the electrically conductive polythiopheneamine network on the surface of a workpiece suitable for use as an electrode in the electropolymerization process. In one such application, a polythiopheneamine polymer network film is formed as an electrically conductive film on a glass surface intended for use as an electrochromic panel. Where the electropolymerization takes place in a solvent which is a good solvent for the resulting amine functional polythiopheneamine polymers, the polymerized chains will be dissolved from the surface of the electrode at which they are formed during the electropolymerization process. In accordance with certain preferred embodiments of the invention, the amine functional polythiopheneamine polymers have an average polymer chain length of 20 to 30 monomer units.

Crosslinking of the amine functional polythiopheneamine polymers can be accomplished by condensation reaction of the amine functionality. The term "conjugated crosslinkers" and all related terms used in this discussion will be understood by those skilled in the art to mean crosslinkers which provide an unbroken path of conjugation from one polymer segment to another within the polythiopheneamine polymer network. Preferred crosslinkers generate —C=N— crosslinks that are in conjugation within the crosslinker as well as with the polymer chains being crosslinked. This provides the uninterrupted network of conjugation, and the advantages resulting therefrom, discussed above. This feature represents a highly significant advance in the art over corresponding uncrosslinked polymers, which may have unintended conjugation defects etc., as discussed above, and even over conjugated polymer segments in a network having non-conjugated crosslinks. In accordance with certain embodiments of the invention, the crosslinking reaction mixture, optionally including dopant, after deprotecting the polymers, can be applied in the unreacted, that is, uncrosslinked, condition to a workpiece intended to receive an electrically conductive polymer coating, gasket, etc. After application to such workpiece surface, the crosslinking reaction can proceed, optionally with heating, resulting in a hardened, or at least form-stable, electrically conductive polymer network layer. Numerous other uses and alternative modes of application will be apparent to those skilled in the art in view of the present disclosure.

In accordance with certain preferred embodiments of the invention, crosslinking is accomplished by condensation reaction of the amine functional group of the polyaminopyrrole polymers with unsaturated conjugated polycarbonyl functional crosslinker, such as unsaturated polyaldehyde functional crosslinker or polyketone, most preferably an unsaturated diketone crosslinker. The crosslinking agent may be added neat or with solvent. Preferably the crosslinking reaction occurs with heating to accelerate the crosslinking reaction and to drive off by-products. Suitable crosslinking agents are commercially available and/or readily prepared, and will be apparent to those skilled in the art in view of the present disclosure. Preferred unsaturated diketones include, for example, benzoquinone, especially 1,4-benzoquinone, its CN and Cl derivatives, and like members of the general class of naphthoquinones, anthraquinones, etc. The conjugated crosslinker may be a suitably functionalized polymer. That is, the crosslinking functionality may be provided as free functionality on a polymer chain, for example, as free carbonyl functionality on a polythiophene or polypyrrole polymer. Such polymers can be prepared by polymerization, for example by electropolymerization, of thiophene and/or pyrrole monomers carrying a suitable (optionally protected) carbonyl group. Exemplary polymer crosslinkers include the 20-30 monomer unit electropolymerization reaction product of 2-thiophenecarboxaldehyde, 3-thiophenecarboxaldehyde, pyrrole-2-carboxaldehyde, pyrrole-3-carboxaldehyde or a mixture of any of them. The carboxaldehyde should be protected as the acetal during electropolymerization (e.g., by prior reaction with ethylene glycol or the like in the presence of pTSA and then returned to the free carbonyl by acid hydrolysis after electropolymerization. Numerous such polymer crosslinkers and their preparation and use will be apparent to those skilled in the art in view of the present disclosure, the significant feature being, as discussed above, creation of an unbroken path of conjugation within and between the polymer segments of the network.

The crosslinking reaction employing polyketone crosslinker may be carried out using techniques well known to those skilled in the art. Preferably the crosslinking reaction is carried out in an appropriate solvent, for example, benzene or toluene. Such technique is applicable, for example, to crosslinking amine functional polythiopheneamine polymers formed in an electropolymerization process, as discussed above, or other conventional polymerization techniques. Preferably heat is added to the crosslinking reaction, both to increase the rate of reaction and to drive off solvents and by-products, such as $H_2O$, produced by the reaction between amine and ketone functionality. Solvents such as benzene, toluene and the like, which form low temperature aziotropes with water, are preferred since they will facilitate reaction by removal of water.

The foregoing description of the invention has presented certain preferred embodiments for purposes of illustration. The description of such preferred embodiments is not intended to be exhaustive or to limit the scope of the invention. Various modifications are possible, many of which will be apparent to those skilled in the art in view of the above teaching, without departing from the true scope of the invention which is intended to be defined by the following claims.

We claim:

1. An electrically conductive polythiopheneamine polymer network comprising conjugated crosslinking between polythiopheneamine polymer segments.

2. The electrically conductive polythiopheneamine polymer network of claim 1 comprising the condensation crosslinking reaction product of amine functional polythiopheneamine polymers with conjugated polyketone crosslinker.

3. The electrically conductive polythiopheneamine polymer network of claim 2 wherein the amine functional polythiopheneamine polymers have an average polymer chain length of 20 to 30 monomer units and are the electropolymerization reaction product of reactant monomers comprising amine functional thiophene monomers and conjugated copolymerization monomers in mole ratio of from 1:20 to 20:1.

4. The electrically conductive polythiopheneamine polymer network of claim 3 wherein the amine functional thiophene monomers are selected from the group consisting of 2-thiopheneamine, 3-thiopheneamine and mixtures thereof.

5. The electrically conductive polythiopheneamine polymer network of claim 4 wherein the amine functional thiophene monomers are the protecting reaction product of 2-thiopheneamine, 3-thiopheneamine, and any mixture thereof with acetone.

6. The electrically conductive polythiopheneamine polymer network of claim 3 wherein the conjugated copolymerization monomers are selected from thiophene, pyrrole, amine functional pyrrole and any mixture thereof.

7. The electrically conductive polythiopheneamine polymer network of claim 2 wherein the conjugated polyketone crosslinker is selected from the group consisting of benzoquinone, naphthoquinone, anthraquinone, the CN and Cl derivatives thereof, and mixtures of any of them.

8. The electrically conductive polythiopheneamine polymer network of claim 1 comprising electrical conductivity enhancing dopant.

9. A process for producing an electrically conductive polythiopheneamine polymer network comprising crosslinking amine functional polythiopheneamine polymers to form conjugated crosslinks between polythiopheneamine polymer segments in the network.

10. The process of claim 9 wherein the amine functional polythiopheneamine polymers are crosslinked by reaction with conjugated polyketone crosslinker.

11. The process of claim 9 wherein the amine functional polythiopheneamine polymers are crosslinked by reaction with conjugated polyketone crosslinker selected from the group consisting of benzoquinone, naphthoquinone, anthraquinone, the CN and Cl derivatives thereof, and mixtures of any of them.

12. The process of claim 9 wherein the amine functional polythiopheneamine polymers are the reaction product of electropolymerization of reactant monomers comprising amine functional thiophene monomers.

13. The process of claim 12 wherein the amine functional thiophene monomers are selected from 2-thiopheneamine, 3-thiopheneamine and mixtures thereof.

14. A process for producing an electrically conductive polythiopheneamine polymer network comprising conjugated crosslinking between polythiopheneamine polymer segments, comprising:
A) producing polythiopheneamine polymers by:
1) protecting the amine functionality of amine functional thiophene monomers selected from 2-thiopheneamine, 3-thiopheneamine and any mixture thereof by protecting reaction with acetone in the presence of pTSA; and
2) forming polythiopheneamine polymers having an average polymer chain length of 20 to 30 monomer units by electropolymerization of reactant monomers consisting essentially of (a) 5 to 50 mole percent of said amine functional thiophene monomers and (b) 50 to 95 mole percent conjugated copolymerization monomers selected from the group consisting of thiophene and pyrrole and any mixture thereof; and
3) acid hydrolysis of the polythiopheneamine to form polythiopheneamine polymers having free amine functionality
B) then adding an electrical conductivity enhancing dopant; and
C) in any order with step (B), crosslinking the amine functional polythiopheneamine polymers to form said network having conjugated crosslinks between polythiopheneamine polymer segments of the network.

* * * * *